United States Patent
Dhawan et al.

(10) Patent No.: US 10,902,076 B2
(45) Date of Patent: Jan. 26, 2021

(54) RANKING AND RECOMMENDING HASHTAGS

(71) Applicant: Adobe Inc., San Jose, CA (US)

(72) Inventors: Anmol Dhawan, Ghaziabad (IN); Walter Wei-Tuh Chang, San Jose, CA (US); Ashish Duggal, Ashok Nagar (IN); Sachin Soni, New Dehli (IN)

(73) Assignee: ADOBE INC., San Jose, CA (US)

( * ) Notice: Subject to any disclaimer, the term of this patent is extended or adjusted under 35 U.S.C. 154(b) by 130 days.

(21) Appl. No.: 16/264,211

(22) Filed: Jan. 31, 2019

(65) Prior Publication Data
US 2019/0163711 A1 May 30, 2019

Related U.S. Application Data

(63) Continuation of application No. 14/703,889, filed on May 5, 2015, now Pat. No. 10,235,464.

(51) Int. Cl.
*G06F 16/00* (2019.01)
*G06F 16/9535* (2019.01)

(52) U.S. Cl.
CPC .............. *G06F 16/9535* (2019.01)

(58) Field of Classification Search
CPC ......... H04L 17/30038; G06F 17/30038; G06F 17/30268; G06F 17/30386; G06F 17/30424; G06F 17/3053; G06F 16/9535
See application file for complete search history.

(56) References Cited

U.S. PATENT DOCUMENTS

| | | | |
|---|---|---|---|
| 8,862,591 B2 | 10/2014 | Chowdhury et al. | |
| 9,563,693 B2 | 2/2017 | Zhang et al. | |
| 10,235,464 B2 * | 3/2019 | Dhawan | G06F 16/9535 |
| 2014/0222721 A1 | 8/2014 | Stock et al. | |
| 2014/0280052 A1 * | 9/2014 | Alonso | G06Q 50/01 707/722 |
| 2014/0358911 A1 | 12/2014 | McCarthy et al. | |

(Continued)

OTHER PUBLICATIONS

Allie Mazzia, James Juett, Suggesting Hashtags on Twitter, University of Michigan, 2013.

(Continued)

*Primary Examiner* — Cheryl Lewis
(74) *Attorney, Agent, or Firm* — Keller Jolley Preece

(57) ABSTRACT

A method for recommending hashtags includes determining keywords from a post planned for publishing by a publisher. An input criteria comprising at least one of age group, geographical location, date range, or a keyword is received. Previous posts associated with the keywords and satisfying the input criteria are obtained. The previous posts are categorized into one or more categories based on sentiment of each post and for each category hashtags used in the obtained previous posts in that category are determined. The hashtags are ranked based on predefined criteria comprising at least one of frequency of appearance of respective hashtag in posts, number of likes or shares or retweets of post comprising respective hashtag, number of followers of person who used respective hashtag, or sentiment of post comprising respective hashtag. The hashtags are then recommended, based on ranking, to the publisher for use with the post planned for publishing.

20 Claims, 8 Drawing Sheets

(56) References Cited

U.S. PATENT DOCUMENTS

| | | |
|---|---|---|
| 2015/0112753 A1 | 4/2015 | Suvarna |
| 2015/0120766 A1 | 4/2015 | Hamilton et al. |
| 2015/0149539 A1 | 5/2015 | Shukla et al. |
| 2016/0117063 A1* | 4/2016 | Fuller .................. H04L 67/02 715/739 |
| 2016/0188734 A1 | 6/2016 | Morley et al. |
| 2016/0196570 A1 | 7/2016 | Weingarden |
| 2016/0253715 A1 | 9/2016 | Xie et al. |
| 2016/0269344 A1 | 9/2016 | Anders et al. |
| 2016/0328401 A1* | 11/2016 | Dhawan ............. G06F 16/9535 |

OTHER PUBLICATIONS

Marco Pennacchiotti and Ana-Maria Popescu, "A Machine Learning Approach to Twitter User Classification", Yahoo! Labs, Proceedings of the Fifth International AAAI Conference on Webblogs and Social Media, pp. 281-288. (Year: 2011).

U.S. Appl. No. 61/760,773 titled "System and Method for Culture Mapping" dated Feb. 5, 2013.

Retweet Trademark of Twitter, Inc.—Registration No. 5176563—Serial No. 77804841 :: Justia Trademarks, Jul. 3, 2017.

Roman Dovgopol, Matt Nohelty, Twitter Hash Tag Recommendation, University of Minnesota, Jan. 31, 2015.

U.S. Appl. No. 14/703,889, Aug. 23, 2017, Preinterview 1st Office Action.

U.S. Appl. No. 14/703,889, Dec. 7, 2017, Office Action.

U.S. Appl. No. 14/703,889, Nov. 21, 2018, Notice of Allowance.

* cited by examiner

Post = "Life in ABC location is fast-paced and busy! Phone XX keeps up with our breakneck pace with its built-in rechargeable lithium-ion battery that gives Talk time up to 14 hours on 3G, standby time up to 10 days, internet use up to 10 hours on 3G, video playback up to 11 hours, audio playback up to 50 hours" ⟵ 302

2 entities ⟵ 304

| Extracted entities | Evidence |
|---|---|
| Phone XX | 8 |
| ABC location | 2 |

4 themes

| Extracted themes | Evidence |
|---|---|
| built-in rechargeable lithium-ion battery | 4 |
| breakneck pace | 4 |
| standby time | 4 |
| Talk time | 4 |

FIGURE 3

```
import nltk
raw = "WRITE RAW TEXT HERE"

#Normalization Starts
tokens = nltk.word_tokenize(raw)  words
= [w.lower() for w in tokens]
porter = nltk.PorterStemmer()  lancaster
= nltk.LancasterStemmer()
stemedwords_first_pass = [porter.stem(t) for t in words]  stemedwords_final_pass
= [lancaster.stem(t) for t in stemedwords_first_pass]
wnl = nltk.WordNetLemmatizer()
completely_normalized_words = [wnl.lemmatize(t) for t in stemedwords_final_pass]

#Normalization Ends, Part of Speech Tagging starts  pos_tagged_words
= nltk.pos_tag(completely_normalized_words)

#Extract Nouns & Proper Nouns in order of their frequency  myDict
= dict()
for key, val in sorted(pos_tagged_words):
   if((val == 'NNP' or val == 'NN') and len(key) > 3):  if(myDict.has_key(key)
     == False):
       myDict[key] = 1  else:
       myDict[key] = (myDict.get(key) + 1)

for word in sorted(myDict, key=myDict.get, reverse=True):
   if(myDict.get(word) > 0):
     print word + ":", myDict.get(word) #Print nouns/proper nouns whose occurrence is atleast once
```

FIGURE 4

SELECT age_gender_results FROM keyword_insights WHERE term = Phone XX and term = camera AND country = US since yesterday  /—502

```
"data": [  {
   "age_gender_results": {
     "gender": {
       "female": 16051,   /—504
       "male": 15230
     },
     "user_age": {
       "13-17": 8201
       "18-24": 7215
       "25-34": 7782
       "35-44": 4490
       "45-54": 2122
       "55+": 1471
     }}}]}
```

FIGURE 5

Sentence = "Serious battery drain issues on my XX. Looks like I need to swing by ABC company today. Anyone else having these issues?" ⎯602

⎯604

Keyword (or keyphrase) 1:
battery

Keyword 2:

Keyword 3:

Keyword 4:

English ▼

Send

| Keyword(s) | Sentiment Value | Sentiment Label | Confliction Value | Confliction Label |
|---|---|---|---|---|
| battery | -0.78 | very negative | 0.24 | mildly conflicting |

FIGURE 6

| Hashtags that are positive on XX's camera | Hashtags that are negative on XX's camera | Hashtags that are negative on XX's camera but are positive on Competitor YY's camera |
|---|---|---|
| #XXcamerarocks | #XXcameraproblems | #compareXXcamera |
| #XXcamerashots | #XXcamerashots | #YYcamerabetter |
| ... | ... | ... |

FIGURE 7

RANKING AND RECOMMENDING HASHTAGS

CROSS REFERENCE TO RELATED APPLICATIONS

The present application is a continuation of U.S. application Ser. No. 14/703,889, filed May 5, 2015. The aforementioned application is hereby incorporated by reference in its entirety.

BACKGROUND

Use of hashtags in social media is increasing day by day. A hashtag includes any word prefixed by a hash character to form a tag or a label. Hashtag is used by a brand to derive higher engagement for its post. When a marketer of the brand is posting the post on a social networking website, via social tools such as ADOBE SOCIAL, then the marketer includes the hashtag in the post. When a user of the social networking website clicks on the hashtag displayed alongside any other post then all public posts, including the post by the marketer of the brand, that include the hashtag are displayed. Hence, the marketer desires to use appropriate hashtag in the post to increase engagement for the post.

Summary

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for recommending hashtags is provided. The method includes determining one or more keywords from a post planned for publishing by a publisher. The post is associated with an entity. An input criteria comprising at least one of age group, geographical location, date range, or a keyword is received. Previous posts associated with the one or more keywords and satisfying the input criteria are then identified. For each post of the obtained previous posts, a sentiment is determined. The obtained previous posts are categorized into one or more categories based on sentiment of each post. For each category, hashtags used in the obtained previous posts in that category are determined. The hashtags are ranked, for each category, based on predefined criteria comprising at least one of frequency of appearance of respective hashtag in posts, number of likes or shares or retweets of post comprising respective hashtag, number of followers of person who used respective hashtag, or sentiment of post comprising respective hashtag. The hashtags are then recommended, based on ranking, for each category to the publisher for use with the post planned for publishing.

Apparatus for substantially performing the method as described herein is also provided.

BRIEF DESCRIPTION OF THE DRAWINGS

FIG. 3 is a diagram showing a post planned for publishing by a marketer and output of a keyword extractor that performs a technique for determining one or more keywords from the post, according to one or more embodiments;

FIG. 4 is a description of a script for determining one or more keywords from a post planned for publishing by a marketer, according to one or more embodiments;

FIG. 5 is a diagram showing an input query to an API of a social networking website and an output received from the API, according to one or more embodiments;

FIG. 6 is a diagram of an output of keyword level sentiment engine, according to one or more embodiments;

FIG. 7 is a diagram of an output of procedure for recommending hashtags, according to one or more embodiments.

Figure 1:
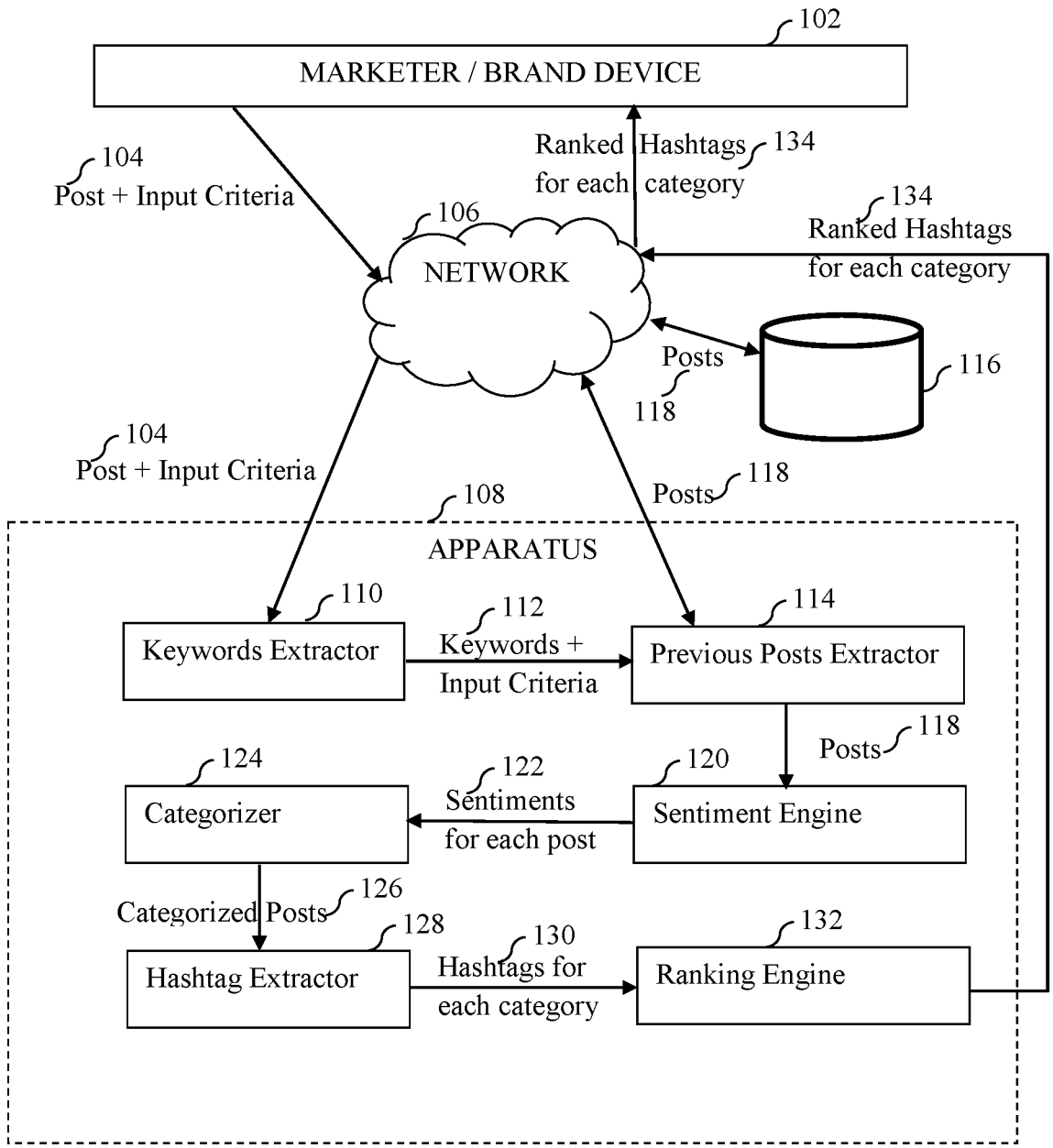
FIG. 1 is a diagram of a system for recommending hashtags, according to one or more embodiments.

While the procedure and apparatus is described herein by way of example for several embodiments and illustrative drawings, those skilled in the art will recognize that the procedure and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

When a marketer of a brand is posting a post on a social networking website, via social tools such as Adobe Social, then the marketer desires to use appropriate hashtag in the post to increase engagement for the post. Currently, the appropriate hashtag is either manually determined by the marketer of the brand or received as a recommendation from the social tool.

One prior technique for recommending hashtag is based on auto-complete functionality, i.e. when the marketer begins typing the hashtag then the social tool automatically completes the hashtag based on the hashtags used by the marketer in the past. However, hashtag recommendation based on auto-complete functionality limits the recommendation to hashtags used by the marketer in the past and is not exhaustive. Hence, there is a need for an improved technique for recommending hashtags.

Another prior technique for recommending hashtags includes pre-processing a tweet to remove noise from the tweet. The pre-processed tweet and a set of tweets is then input to a classifier. The classifier uses two classification techniques such as Naive Bayes and K-Nearest Neighbor to determine hashtags for the tweet. K-Nearest Neighbor technique takes the set of tweets and words from the pre-processed tweet as input and generates hashtags. Once classification, i.e. hashtag determination, is performed using both techniques then a weighted average is performed for all determined hashtags to generate final list of hashtags. However, hashtag recommendation using Naive Bayes and K-Nearest Neighbor is computationally intensive and time consuming. Also, Naive Bayes and K-Nearest Neighbor techniques do not take sentiment of the tweet into consideration resulting in recommendation of hashtags with negative sentiments and negative impact. Hence, there is a need for an improved technique for recommending hashtags.

In accordance to embodiments of the present invention and as described in more detail below, a procedure for recommending hashtags is provided. A marketer (also referred to as a publisher), of a brand, inputs a post into a social tool such as ADOBE SOCIAL. The post is planned for publishing on a social networking website, such as FACEBOOK, via the social tool. The post is associated with the brand. The social tool analyzes the post using natural language processing techniques and determines one or more keywords from the post. The one or more keywords are indicative of name of the brand, product of the brand, or feature of a product of the brand. An input criteria including at least one of age group, geographical location, date range, or a keyword is also received from the marketer. Previous posts associated with the one or more keywords and satisfying the input criteria are then obtained from the social networking website by the social tool. The social tool sends a query to API offered by the social networking website and obtains the previous posts satisfying the query. The query includes the one or more keywords and the input criteria. In one embodiment, the obtained previous posts are categorized into one or more categories. Sentiments are determined from the obtained previous posts to determine the one or more categories and to perform the categorization based on the sentiments. The one or more categories include at least one of 1) posts having positive sentiment for the one or more keywords, 2) posts having negative sentiment for the one or more keywords, and 3) posts having negative sentiment for the one or more keywords when the one or more keywords are used for the brand but having positive sentiment when the one or more keywords are used for some other brand. Hashtags used in the obtained previous posts in each category are determined and are categorized in respective categories. The hashtags are then ranked based on predefined criteria including at least one of frequency of appearance of respective hashtag in posts, number of likes or shares or retweets of post comprising respective hashtag, number of followers of person who used respective hashtag, or sentiment of post comprising respective hashtag. The ranking of hashtags is performed under each category. The ranking includes allocating a score to each hashtag based on each criterion in the predefined criteria, and determining a final score for each hashtag by calculating weighted average of the score corresponding to each criterion. The hashtags are then recommended, based on ranking, to the publisher for use with the post planned for publishing. The recommendation is performed under each category.

In another embodiment, a marketer, of a brand, inputs a post into a social tool such as ADOBE SOCIAL. The post is planned for publishing on a social networking website, such as FACEBOOK, via the social tool. The post is associated with the brand. The social tool analyzes the post using natural language processing techniques and determines one or more keywords from the post. The one or more keywords are indicative of name of the brand, product of the brand, or feature of a product of the brand. An input criteria including at least one of age group, geographical location, date range, or a keyword is also received from the marketer. Previous posts associated with the one or more keywords and satisfying the input criteria are then obtained. The social tool sends a query to API offered by the social networking website and obtains the previous posts satisfying the query. The query includes the one or more keywords and the input criteria. Hashtags used in the obtained previous posts are determined. The hashtags are then ranked based on predefined criteria including at least one of frequency of appearance of respective hashtag in posts, number of likes or shares or retweets of post comprising respective hashtag, number of followers of person who used respective hashtag, or sentiment of post comprising respective hashtag. The ranking includes allocating a score to each hashtag based on each criterion in the predefined criteria, and determining a final score for each hashtag by calculating weighted average of the score corresponding to each criterion. The hashtags are then recommended, based on ranking, to the publisher for use with the post planned for publishing.

Advantageously, automatic recommendation of hashtags based on keywords of the post reduces burden on the publisher to determine appropriate hashtags. In addition, inclusion of appropriate hashtags derive higher engagement for the post. Further, the sentiment based categorization of any post and recommendation of a hashtags based on sentiment helps a marketer to take appropriate call regarding that hashtag. For example, in one scenario the marketer may ignore the hashtags that are negative or that have negative sentiment for the marketer's brand or product while in another scenario the marketer may just want to focus on the hashtags that have negative sentiment to address the audience who have negative opinion about the marketer's brand or product.

Terms Definitions in Addition to Plain and Dictionary Meaning of the Terms

A hashtag includes any word prefixed by a hash character to form a tag or a label. Examples of hashtag includes #camera, #phone etc. Hashtag is used by a brand to derive higher engagement for its post on a social networking website. Hashtag is not just limited to a word and can include a phrase prefixed by the hash character too. The hashtag allows grouping of similarly tagged posts or messages or comments or blogs, and also allows an electronic search to return all results having the hashtag that is searched.

A social networking website is a website that facilitates networking among users. Examples of social networking website includes Facebook, Blogs, Twitter etc. The social networking website also includes applications that facilitate networking among users such as mobile applications, desktop applications etc.

A social page is a page on the social networking website created by a brand for its own usage. Such social page includes posts related to the brand. A marketer or owner or other responsible personnel may be the owner or moderator of a social account of the brand with the social networking website. Each brand or company can create and maintain a dedicated social account for its own usage. Using the social account the social page is created by the brand. The brand typically reaches out to customer base via the social page. The brand also posts updates regarding or concerning the brand on the social page. The social page can be managed manually by the responsible personnel or can be managed using one or more social tools available for managing the social page. Examples of the social tools include, but are not limited to, Adobe Social.

A user is an entity or a person visiting the social networking website and engaging with content and other users of the social networking website. The user interacts with other users via the social networking web site. Examples of interaction includes posting a post, liking the post or posts made by other users, sharing the post or the posts, commenting on the posts etc. The user can be an individual account holder of the social networking website or can include a publisher or marketer of a brand. The brand also creates an account of its own with the social networking web site. The account of the brand is maintained by the publisher or the marketer or appropriate stakeholders. The user can include hashtags in the post made or posted by the user. The user can receive recommendation for hashtags from the social tool for a particular post.

A marketer or a publisher is an entity or a person who manages the account of a brand with the social networking website, or who has authority to do so. The marketer can be any personnel who is tasked with managing the account. The marketer uses a social tool, such as Adobe Social, for managing the account. The social tool enables the marketer to manage the account and activities associated with the account. Examples of managing the account includes posting posts on behalf of the brand, monitoring the post, searching posts, tracking engagement of users with the post, increasing engagement with the post by including relevant hashtags in the post or associating the post with relevant hashtags, identifying such hashtags etc. The marketer associates the post with the hashtag to increase engagement of the post. For example, the marketer creates a post related to a product of the brand and wants the post to be read by maximum number of users. In addition, the marketer also wants the post to be read by relevant users and not those users for whom the post is a spam or is irrelevant. For ensuring that the post reaches correct users the marketer associates relevant hashtag with the post. The users who are interested in the product of the brand can search the post by clicking on the relevant hashtag such as #"name of the product of the brand", #"feature of the product of the brand" etc.

A social tool, such as Adobe Social, enables the marketer to manage the account and the post associated with the account. The managing of the account includes identifying relevant hashtags for a post to be posted by the marketer. The social tool recommends relevant hashtags for the post to the marketer based on content of the post. The marketer can include such recommended hashtags in the post to increase engagement of the post. The social tool recommends relevant hashtags using the procedure described herein.

A post is a content posted on a social networking website by an account holder of the social networking website. Various users and brands can create respective accounts with the social networking website. Using the account, the account holders can then interact or engage with other users by posting content or responding to content posted by other users. Examples of the engagement or interaction includes posting a post, liking the post or posts made by other users, sharing the post or the posts, commenting on the posts etc. The account holders, typically, associate the post with relevant hashtags or include the relevant hashtags in the post to increase engagement of the post. Use of the hashtag enables grouping of similarly tagged posts or messages or comments or blogs, and also allows an electronic search to return all results having the hashtag that is searched.

A brand (also referred to as an entity) is a company or an entity or a person. The brand can create an account on the social networking website by creating an account. The account is maintained by a personnel of the brand. The brand typically reaches out to customer base via the social page. The brand also posts updates regarding or concerning the brand on the social page. Examples of the brand include, but are not limited to companies such as Adobe, Microsoft etc. The brand is identified using a name and hence, the identification is referred to as the name of the brand.

A product of the brand is an object sold or manufactured or used or exported by the brand. The name of the product includes the identification using which the product is known or identified.

A feature of the product of the brand includes any feature or functionality of the product or component of the product or functionality of the component of the product.

In the following discussion, an "Example Environment" is first described that is operable to employ techniques described herein. Following this, a section entitled "Example Procedures" describes some example procedures in accordance with one or more embodiments.

Example System

FIG. 1 is a diagram of a system 100 for recommending hashtags, according to one or more embodiments. The system 100 includes a marketer/brand device 102 operated by a marketer of an entity (also referred to as brand). The marketer creates an account with the social networking website such as FACEBOOK by accessing the social networking website via a network 106. In one embodiment, the marketer accesses the social networking website directly and creates a social page via the social networking website. In another embodiment, the marketer of the entity uses services (such as ADOBE SOCIAL) offered by an apparatus 108 via the network 106 to create or manage the social page of the entity. The marketer accesses the service of the apparatus 108 by maintaining an account with the apparatus 108. Example of the service includes ADOBE SOCIAL and example of the apparatus 108 includes a server maintained by an entity offering social tool. The apparatus 108 provides such service as a cloud based service or in any other form, for example as an application, plugin or any other form of providing the service. The marketer logs into the service via the marketer device 102 and accesses the social networking website.

The marketer inputs a post, planned for publishing on the social page or any other page on a social networking website, via a user interface offered by the apparatus 108. The post is received by the apparatus 108.

In some embodiments, the marketer also provides one or more of a date range, a geographical location, age group, name of a competitor, name of a product of the competitor, or name of a feature of the product of the competitor as an input criteria. The marketer specifies the input criteria using the user interface offered by the apparatus 108. The input criteria is received by the apparatus 108. In some embodiments, default settings of the account of the entity maintained by the apparatus 108 can be used as the input criteria and the marketer need not specify or provide the input criteria. Examples of the default settings include predefined date range, predefined geographical location, predefined age group etc. The post and the input criteria are received by the apparatus 108 via the network 106 and are indicated as Post+Input Criteria 104 in FIG. 1.

The apparatus 108 includes various engines to process the post and the input criteria. A keyword extractor 110 processes the post for determining one or more keywords from the post. The keyword extractor 110 analyzes the post using natural language processing techniques for determining the one or more keywords and such techniques have been described in detail in Example Procedures section. The one or more keywords relate to the entity and can include name of the entity, name of a product of the entity, name of a feature of the product of the entity etc. In one embodiment, the keywords can also be provided as an input by the marketer. A previous posts extractor 114 then receives the one or more keywords and the input criteria 116, and interacts with the social networking website or the storage device 116 to obtain one or more previous posts. The storage device 116 is maintained and supported by the social networking website. The previous posts include the posts already posted by the marketer or other users. In one embodiment, the previous posts extractor 114 queries API (application programming interface) offered by the social networking website to obtain relevant posts 118 directly. The relevant posts include those previous posts that are associated with the one or more keywords and that satisfy the input criteria. The previous posts extractor 114 provides or sends the one or more keywords and the input criteria to the API as a query and receives the relevant posts 118 as a response. In another embodiment, the previous posts extractor 114 accesses the previous posts via the API offered by the social networking website and processes the previous posts itself to identify the relevant posts 118. In such scenario, the previous posts extractor 114 may optimize or streamline the access to the previous posts and proceed in a systematic or organized or structured manner. For example, the previous posts extractor 114 may first process the previous posts posted by a particular entity followed by the previous posts posted by any other entity. The particular entity may be the entity itself or a competitor. Similarly, in other examples, the processing can be based on various parameters such as a particular entity, a particular product, a particular feature, a date range, recent posts, geographical location, age group or any other attribute or parameter.

The relevant posts 118 are then processed by a sentiment engine 120 to either determine overall sentiment of each relevant post or to determine sentiment of the one or more keywords in each relevant posts. The overall sentiment is determined using various techniques. In one example, the sentiment engine 120 uses machine learning algorithm based on natural language processing (NLP) to determine overall sentiment of each relevant post. A lexicon based sentiment engine can make use of NLP or lexicons to understand the text and extract the sentiment into three categories: positive, negative and neutral. In another embodiment, the sentiment engine 120 uses algorithms available from SEMANTRIA. The output of SEMANTRIA can be a numerical value or can be a category of value such as HIGH, LOW, MEDIUM etc. The sentiment score can also be a range or a normalized value. The keyword level sentiment for each relevant post is also determined using various existing techniques as explained in detail in Example Procedure section. Such techniques are used for determining sentiment of a keyword in a sentence, such as the technique provided by ALCHEMY API can be used in one embodiment. A sentence is inputted and an output indicating sentiment score for each keyword is outputted.

Based on the sentiment scores or values 122, a categorizer 124 then categorizes the relevant posts 118 into one or more categories. In one embodiment, the categories include 1) posts having positive sentiment for the one or more keywords, 2) posts having negative sentiment for the one or more keywords, and 3) posts having negative sentiment for the one or more keywords when the one or more keywords are used for the entity but having positive sentiment when the one or more keywords are used for some other entity. There can be more such categories as per requirement of the entity or the marketer. Options can be provided to the marketer to add more of such categories. The relevant posts are categorized into such categories. A hashtag extractor 128 determines hashtags used in categorized posts 126 under each category. The hashtags are determined by either the hashtag extractor 128 or can be queried by the hashtag extractor 128 from an API offered by the social networking website. Under each category, the determined hashtags 130 are then ranked based on a predefined criteria by a ranking engine 132. Examples of the predefined criteria include at least one of frequency of appearance of respective hashtag in relevant posts in respective category, number of likes or shares or retweets of relevant post including respective hashtag, number of followers of a person or a user who used respective hashtag, or sentiment of relevant post including respective hashtag. A score is allocated to each hashtag based on each criterion in the predefined criteria. A final score is determined for each hashtag by calculating weighted average of the score corresponding to each criterion. The apparatus 108 then recommends the relevant and ranked hashtags 134 under each category. The marketer receives the respective hashtags recommendation via the user interface offered by the apparatus 108, and uses one or more of recommended hashtags for the post planned for publishing. The marketer then publishes the post with relevant hashtags via the apparatus 108. The apparatus 108 enables publishing of the post along with relevant hashtags on the social networking web site.

The algorithms and procedures for performing various operations of the apparatus 108 are now explained in conjunction with example procedures.

Example Procedures

Figure 2:
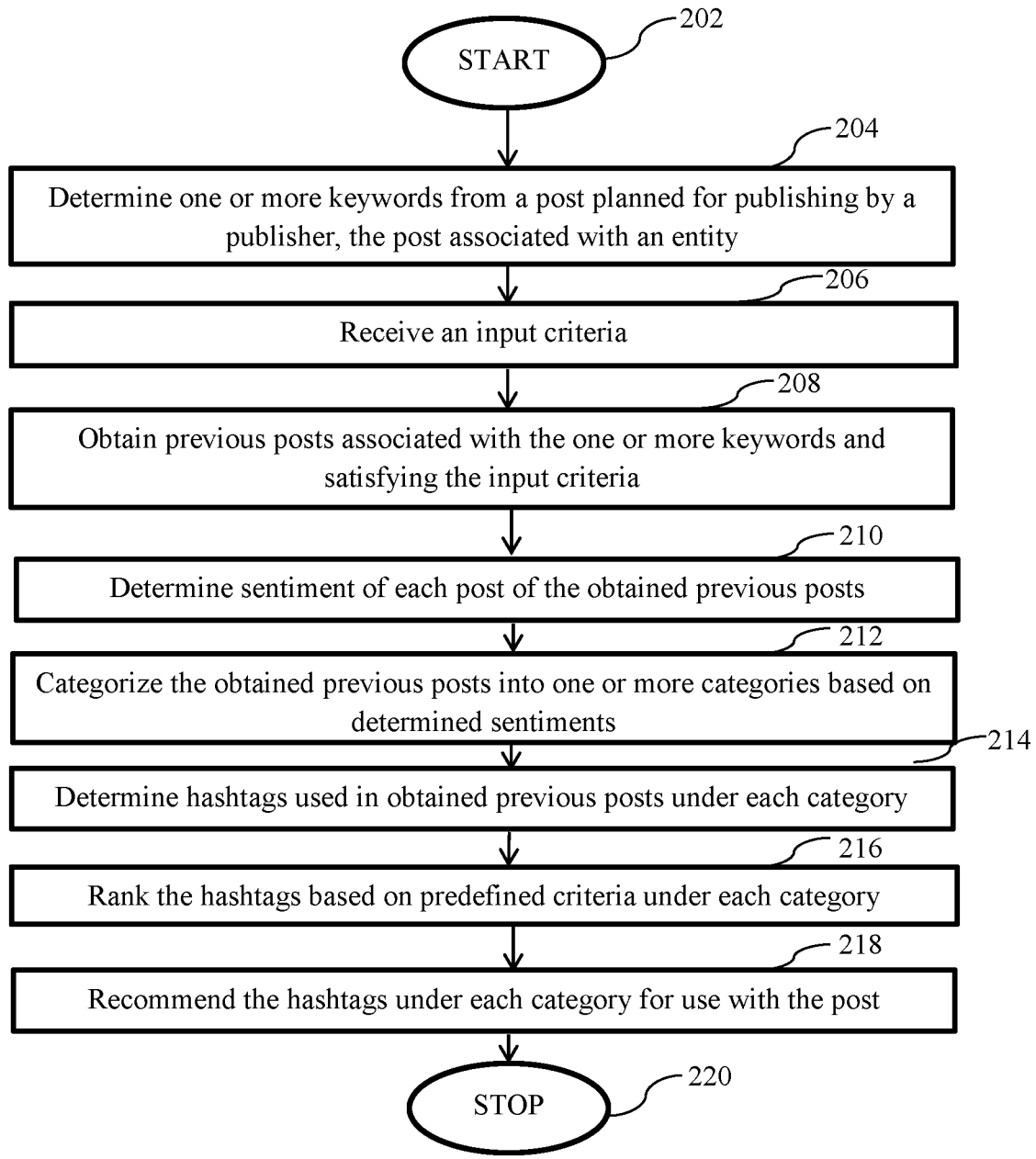
FIG. 2 is a flowchart of a procedure for recommending hashtags, as performed by the system of FIG. 1, according to one or more embodiments.

FIG. 2 is a flowchart of a procedure for recommending hashtags by an apparatus, such as the apparatus 108 of FIG. 1, according to one or more embodiments.

The procedure starts at step 202 and proceeds to step 204.

At step 204, one or more keywords are determined from a post planned for publishing by a publisher or a marketer of an entity. The entity creates an account with a social networking website for posting content or post. The entity also creates an account with a social tool used for managing content or posts on the social networking website. In one embodiment, the marketer of the entity manages or uses the accounts on behalf of the entity. The marketer inputs the post via a user interface provided by the social tool. The post is received by the social tool and processed using natural language processing techniques to determine the one or more keywords. The one or more keywords are indicative of at least one of name of the entity mentioned in the post, name of product of the entity mentioned in the post, name of a feature of the product of the entity mentioned in the post. The one or more keywords include noun phrases as well. The one or more keywords represent main idea within the post that the marketer wants to communicate to users. Various theme extraction techniques, such as that provided by SEMANTRIA, can also be used for determining the theme or main idea or noun phrase or the one or more keywords. The one or more keywords include all possible variations such as theme, main idea, noun phrase etc. Various existing statistical auto-tagger or summarizer can also be used to determine the one or more keywords. FIG. 3 shows an exemplary output including one or more keywords of one such existing technique. Post 302 is the post planned for publishing by the marketer. Output 304 including the one or more keywords is determined at step 204. FIG. 4 shows an exemplary script for determining the one or more keywords from the post.

In one embodiment, a part of speech tagger (POS) trained on entity's content is used to identify keywords from the post. Examples of such POS includes, but are not limited to, Natural Language Toolkit (NLTK) POS etc. An exemplary way in which such POS works includes tokenizing the content of the post. The tokenized content is then converted to lower case. The conversion is then followed by stemming. Stemming is the process of finding stems of the words by reducing derived or infected words to their root or stems. NLTK POS offers two stemmers, Ported and Lancaster. Either can be used for performing the stemming. Stemming is then followed by lemmatization. Lemmatization is the process of grouping together different inflected forms of a word so that the group can be analyzed as a single item. Lemmatization is followed by POS tagging. POS tagging is the process of classifying words into parts of speech and labeling the words accordingly. Output of the POS tagging indicates whether a word is a noun, proper noun, verb adjective, pronoun, article etc. The nouns and proper nouns indicate subjects and hence, the nouns and proper nouns are organized in order of their frequency in normalized text. The normalized text is obtained after tokenizing, stemming and lemmatizing. The noun or proper noun with frequency above desired frequency or with highest frequency are determined to be the one or more keywords.

In one embodiment, the marketer can provide the one or more keywords as an input and the determining can be bypassed. In another embodiment, the marketer can provide keywords in addition to determined one or more keywords. In yet another embodiment, only the determined one or more keywords are used.

At step 206, an input criteria is received. The input criteria can be inputted by the marketer or can be a default criteria set as per the account of the entity. The input criteria can include at least one of age group of target users of the post, geographical locations of the target users of the post, gender, date range for which previous posts need to be considered, name of a competitor, name of a product of the competitor, name of a feature of the product of the competitor etc. The input criteria helps the marketer in increasing relevancy of results that the marketer desire. The default criteria can be at least one of a default date range, a default geographical location, a default age group, or null value indicating that no further filtering needs to be done based on the input criteria. The input criteria can be provided at any point in time, i.e. before or after inputting the post planned for publishing.

At step 208, previous posts are obtained and processed. The previous posts are processed to determine or shortlist the previous posts that include the one or more keywords and that also satisfy the predefined criteria. The previous posts that include the one or more keywords and that also satisfy the predefined criteria are referred to as relevant posts. In one embodiment, the relevant posts are identified using API offered by the social networking website. The one or more keywords and the input criteria are provided or sent as an input to the API and the relevant posts are obtained as output from the API. In other embodiment, the previous posts are obtained from the API and the processing is performed by the social tool to determine the relevant posts from the previous posts. For example, Facebook provides API that supports filtering based on the keywords, age group, geographical location, and date range. FIG. 5 shows an input query 502 for the API and an output 504 received from the API. The output 504 shows the number of results (the number of the relevant posts) matching each input criteria. For example, there are 8201 relevant posts for the age group 13-17. The input query includes one or more keywords indicative of product name and product feature.

At step 210, sentiment of each obtained previous post (relevant post) is determined. The sentiment detection is explained in detail in conjunction with step 212.

At step 212, the obtained previous posts (the relevant posts) that are associated with the one or more keywords and that satisfy the input criteria are categorized into one or more categories. In one embodiment, the categorization is based on sentiment of respective post or based on sentiment of the one or more keywords included in respective post. The categories are also generated based on the sentiment as a parameter or an attribute. Examples of the categories include, but are not limited to, 1) posts having positive sentiment for the one or more keywords, 2) posts having negative sentiment for the one or more keywords, and 3) posts having negative sentiment for the one or more keywords when the one or more keywords are used for the entity but having positive sentiment when the one or more keywords are used for some other entity. There can be more such categories as per requirement of the entity or the marketer. Options can be provided to the marketer to add more of such categories. The relevant posts are categorized into such categories.

Each relevant post is processed using various existing techniques to determine keyword level sentiment for each keyword of the one or more keywords. Based on the sentiment, the relevant post is categorized into respective category. For example, if the sentiment for one keyword in the relevant post is positive and if the sentiment for another keyword in the same relevant post is negative then the sentiment for each category is added or averaged to arrive at overall sentiment score for the relevant post. The overall sentiment score is then checked against a predefined score or threshold. If the overall sentiment falls in neutral to positive range then the relevant post is categorized in category 1. If the overall sentiment score falls in negative range then the relevant post is categorized in category 2.

If the input criteria also includes a keyword or more, then keyword level sentiment is also determined for each such keyword. The keywords (can include phrases) in input criteria include one or more competitor names, one or more product names of competitors, or one or more feature names of product of the competitors. If such keyword is present in the relevant post then the sentiment score is determined for such keyword. In one embodiment, if more than one such keyword exits then maximum sentiment score for all such keywords is determined. If the maximum sentiment score for all competitor keywords is greater than the overall sentiment score of the one or more keywords determined from the post then the relevant post is categorized in category 3 else not. In another embodiment, average sentiment score is used instead of maximum sentiment score.

In various embodiments, the order of determining sentiments can vary. For example, competitor keyword sentiment can be determined first followed by sentiment for one or more keywords determined from the post or vice versa to optimize the processing.

The keyword level sentiment score is determined using various existing technologies such as using SKYTTLE API, ALCHEMY API, or SENTIMENTICS API. FIG. 6 shows a snapshot of such technique (algorithm) for determining keyword level sentiment. A sentence 602 is inputted and an output 604 indicating sentiment score for each keyword is outputted.

In an example, when the one or more keywords include a name of a feature or component of the product, such as battery of a camera, then the sentiment of the battery is determined in each obtained previous post. It may happen that existing tools when determining sentiment of entire post may give a negative sentiment but when sentiment based on the battery is determined then the sentiment of that same post may become positive. In some embodiments, the sentiment is determined for the name in each of the obtained previous posts. Other keywords, if any present other than the name, are either filtered by the marketer or by any other known technique such as stemming, or context based filtering. In some embodiments, the method includes filtering the output of step 204 by the marketer or using other known techniques.

At step 214, hashtags are determined or extracted from the relevant posts. The hashtags are then categorized based on the category of the relevant post from which a respective hashtag is extracted.

At step 216, the hashtags are ranked under each category to generate a list of relevant hashtags. The ranking is based on various parameters referred to as predefined criteria. Examples of the parameters for ranking hashtags include, but are not limited to, at least one of frequency of appearance of respective hashtag in relevant posts, number of likes or shares or retweets of relevant post including respective hashtag, number of followers of user or person who used respective hashtag, keyword level sentiment of one or more keywords in a relevant post, or sentiment of relevant post comprising respective hashtag. Various parameters can be selected by the marketer based on which the ranking needs to be done or the selection can be based on default predefined criteria. For example, a score of a hashtag from a relevant post can be determined as > Score of hashtag=Existing score of hashtag+(Sentiment score of a keyword from one or more keywords in a relevant post−Threshold)*number of followers of users who used respective hashtag Initially, the existing score of hashtag can be assigned as zero or some predefined number.

The high scoring hashtags are then identified as hashtags having score over a predefined threshold score under each category.

At step 218, the high scoring hashtags are then recommended to the marketer under each category. The recommended hashtags can then be used by marketer in the post planned for publishing by the marketer. Incorporating relevant hashtag in the post helps the marketer in reaching out to more users as the hashtags are recommended based on relevancy. FIG. 7 is an exemplary snapshot indicating recommendation of hashtags under each category.

The procedure stops at step 220.

In one embodiment, step 210 and step 212 may be bypassed or not performed and instead all relevant posts are processed to determine hashtags and rank the hashtags. The ranked hashtags are then recommended to the marketer.

Various scenarios in which recommendation of hashtags helps marketer increase engagement of the post are now discussed.

Scenario 1: A marketer of XX entity wants to publish a post on Facebook or a tweet on Twitter focusing on the camera of newly launched XX's phone with some pictures taken by XX's camera. Post="Every day, people take more photos with XX's phone than with any other camera. That's because the XX's phone camera makes it so remarkably easy. Now, in addition to its large 1.5 micron pixels and f/2.2 aperture, the world's most popular camera is packed with new technologies to help everyone take great photos". The marketer wants this post to be read by XX's camera enthusiast and hence, the marketer wants to use those hashtags which are frequently used by users while discussing XX's phone camera. In illustrated scenario, the marketer may also want to use hashtags that generated positive sentiments for XX's camera and not the hashtags that generated negative sentiments. The social tool as discussed herein recommends such desired and relevant hashtags, i.e. #XXcamerarocks, to the marketer.

Scenario 2: The marketer wants to publish a post or tweet focusing on the tips to improve battery life of XX's phone. The marketer want the post to be read by those users, whose XX's phone battery is draining out faster and at the same time, the marketer wants that if any user in future come across this problem and uses or searches this hashtag, the user should also see this post. In illustrated scenario, the marketer may want to focus on the hashtags that generated negative sentiments. The social tool as discussed herein recommends such desired and relevant hashtags, i.e. #XXphonebatterydrain, to the marketer based on previous posts that discuss "XX's phone" and "battery" and have a negative sentiment.

Scenario 3: The marketer creates different posts for different age groups. For example, when it comes to health application in XX's phone, the marketer targets middle and older age groups with the following post: "How are you" now has a really accurate answer. Heart rate, blood sugar, cholesterol—your health applications are great at collecting all that data. The new health application Z puts that data in one place, accessible with a tap, giving you a clear and current overview of your health. You can also create an emergency card with important health information and that's available right from your Lock screen. The marketer targets younger age groups with the following post: The newly launched XX's phone has significant improvements in fitness aspects. The new health application Z makes available the calories burned data right from your lock screen. The marketer wants the first post to be read by people who are discussing health application Z and whose age group is 40+. The marketer wants to use those hashtags in this post which are frequently used by old age group users while discussing health application Z. The social tool discussed herein recommends different hashtags for these posts based on the relevant posts from different age groups.

Scenario 4: The marketer wants to publish a post focusing on the improved battery of newly launched XX phone for location ABC. This is what post looks like: Life in ABC is fast-paced and busy! XX phone keeps up with our breakneck pace with its built-in rechargeable lithium-ion battery that gives talk time up to 14 hours on 3G, Standby time up to 10 days, Internet use up to 10 hours on 3G, Video playback up to 11 hours, Audio playback up to 50 hours. The marketer wants this post to be read by people who are discussing XX phone battery and who live around ABC. The social tool recommends #XXphonebattery as a hashtag for this post.

Scenario 5: The marketer wants to publish a post focusing on the confusion related to the bending of newly launched XX phone. This is what post looks like: Our XX phones are designed, engineered and manufactured to be both beautiful and sturdy. We chose high-quality materials for their strength and durability. With normal use a bend in XX phone is extremely rare and through our first six days of sale, a total of nine customers have contacted us with a bent in XX phone. The marketer wants potential customers to read this post and allay the fear in the mind of these customers regarding bending issues of XX phone. The social tool as discussed herein can find that a large number of people are comparing XX phone with XY phone and XZ phone when it comes to bending because these phones have almost same form factor. The social tool also finds that most of the posts are positive on XY phone and XZ phone, and claims that they don't bend. The social tool then recommends hashtags like #XYphonebend etc. which are widely used while comparing bending issues of XX phone with XY phone.

Example Environment

Figure 8:
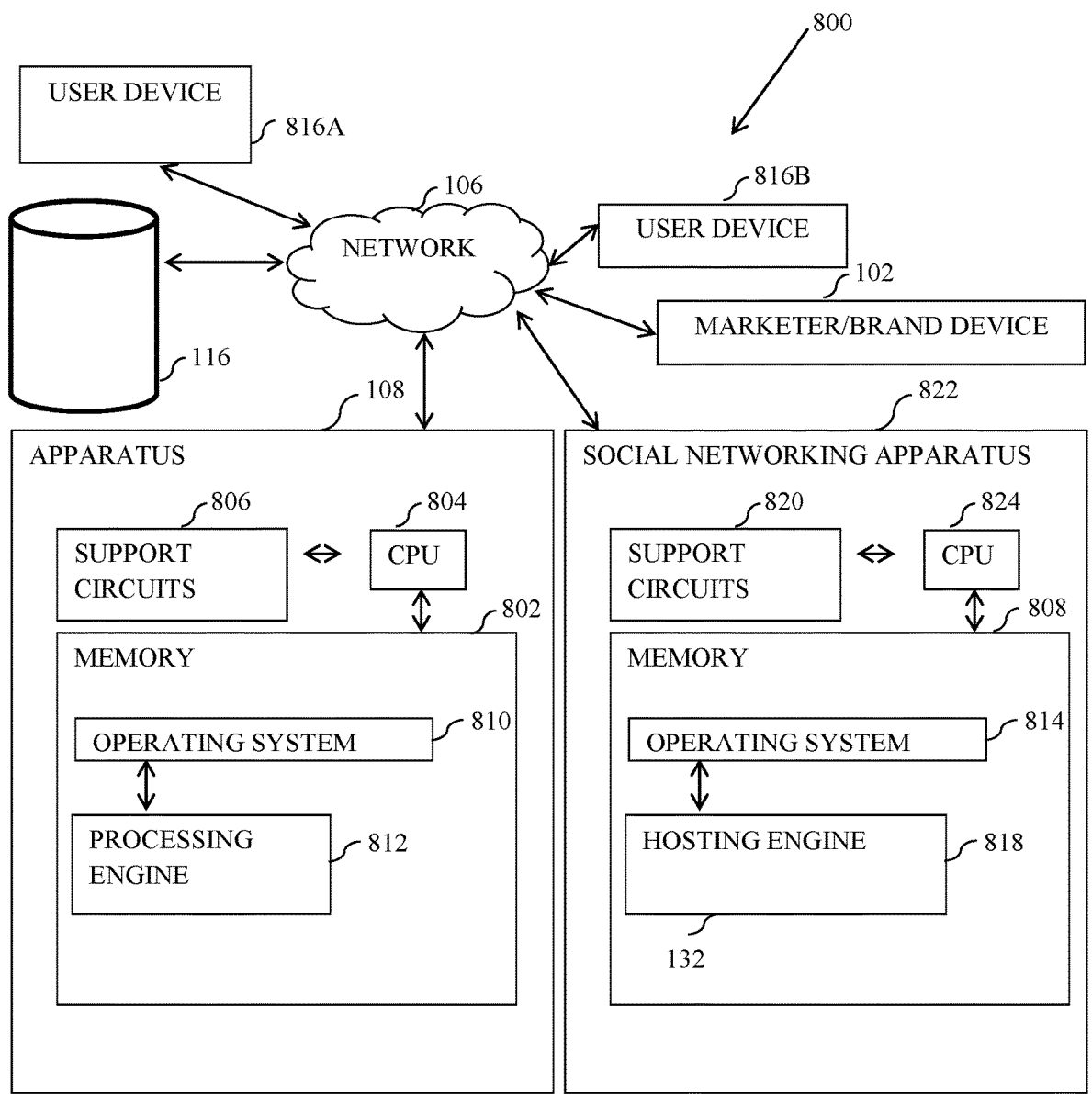
FIG. 8 is an environment for recommending hashtags, according to one or more embodiments.

FIG. 8 is a diagram of an environment 800 for recommending hashtags for a post planned for publishing, according to one or more embodiments. The environment 800 includes one or more user devices, such as a user device 816A and a user device 816B. The user devices can communicate with a social networking apparatus 822 (hereinafter referred to as the apparatus 822 and example includes FACEBOOK APPARATUS or SERVER) via a network 106. The environment 100 also includes one or more marketer/brand devices (hereinafter referred to as the marketer devices), such as a marketer device 102. The marketer devices can communicate with a social tool apparatus 108 (hereinafter referred to as the apparatus 108 and example includes ADOBE SOCIAL APPARATUS or SERVER) via the network 106. The environment 100 also includes a storage device 116 accessible via the network 106, or directly by the apparatus 108.

Hardware Description

Examples of the apparatus 108 include, but are not limited to, a desktop computer, server, a combination of one or more servers, or any other electronic device having one or more processors. The apparatus 108 can be present at one single location or can be present at different locations in a distributed environment.

The apparatus 108 includes a Central Processing Unit (CPU) 804, support circuits 806, and a memory 802. The CPU 804 may include one or more commercially available microprocessors or microcontrollers that facilitate data processing and storage. The various support circuits 806 facilitate the operation of the CPU 804 and include one or more clock circuits, power supplies, cache, input/output circuits, and the like. The memory 802 may include at least one of Read Only Memory (ROM), Random Access Memory (RAM), disk drive storage, optical storage, removable storage or the like. The memory 802 includes an operating system 810, and a processing engine 812. The operating system 810 may include various commercially known operating systems.

The apparatus 108 may further include one or more input devices (not shown in FIG. 1) connected to the apparatus 108. Examples of the one or more input devices include, but are not limited to, peripheral devices, keyboard, mouse etc. In some embodiments, the apparatus 108 may not be connected to the input devices separately and may have functionalities of these input devices built into the apparatus 108, such as in cases in which the apparatus 108 is touch enabled device, gesture enabled device, or paired to such similar devices that act as the input devices. The processing engine 812 includes various other engines to perform procedures as described herein. Various other engines included in the processing engine 812 includes the keyword extractor 110, the previous posts extractor 114, the sentiment engine 118, the categorizer 124, the hashtag extractor 126 and the ranking engine 132.

The storage device 116 is, for example, a storage drive or a storage system, or a distributed or shared storage system. In some embodiments, the storage device 116 is coupled to a processing device (not shown) to facilitate extraction or retrieval or access of data stored in the storage device 116.

Examples of the apparatus 822 include, but are not limited to, a desktop computer, server, a combination of one or more servers, or any other electronic device having one or more processors. The apparatus 822 can be present at one single location or can be present at different locations in a distributed environment.

The apparatus 822 includes a Central Processing Unit (CPU) 824, support circuits 820, and a memory 808. The CPU 804 may include one or more commercially available microprocessors or microcontrollers that facilitate data processing and storage. The various support circuits 820 facilitate the operation of the CPU 824 and include one or more clock circuits, power supplies, cache, input/output circuits, and the like. The memory 808 may include at least one of Read Only Memory (ROM), Random Access Memory (RAM), disk drive storage, optical storage, removable storage or the like. The memory 808 includes an operating system 814, and a hosting engine 818. The operating system 814 may include various commercially known operating systems.

The apparatus 822 may further include one or more input devices (not shown in FIG. 1) connected to the apparatus 822. Examples of the one or more input devices include, but are not limited to, peripheral devices, keyboard, mouse etc. In some embodiments, the apparatus 822 may not be connected to the input devices separately and may have functionalities of these input devices built into the apparatus 822, such as in cases in which the apparatus 822 is touch enabled device, gesture enabled device, or paired to such similar devices that act as the input devices.

Examples of the user devices include, but are not limited to, a desktop computer, a smartphone, a tablet computer, a laptop computer, a mobile computer or any other electronic device having one or more processors. Each user device includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. Each user device may further include one or more input devices connected to the corresponding user device. Examples of the one or more input devices include, but are not limited to, peripheral devices, keyboard, mouse etc. In some embodiments, the user device may not be connected to the input devices separately and may have functionalities of these input devices built into the user device, such as in cases in which the user device is touch enabled device, gesture enabled device, or paired to such similar devices that act as the input devices.

Examples of the network 106 include, but are not limited to, internet, local area network (LAN), wireless area network, wired area network etc.

Examples of the marketer devices include, but are not limited to, a desktop computer, a smartphone, a tablet computer, a laptop computer, a mobile computer or any other electronic device having one or more processors. The marketer device 102 includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. The marketer device 102 may further include one or more input devices connected to the marketer device 102. Examples of the one or more input devices include, but are not limited to, peripheral devices, keyboard, mouse etc. In some embodiments, the marketer device 336 may not be connected to the input devices separately and may have functionalities of these input devices built into the marketer device 336, such as in cases in which the marketer device 336 is touch enabled device, gesture enabled device, or paired to such similar devices that act as the input devices.

Functional Description

The functional working of the environment 800 is now explained. While the working is described using the apparatus 108, the functionalities of the apparatus 108 can be combined with that of the apparatus 822 to offer the combined functionalities as part of a service provided by the apparatus 822 as well.

The apparatus 822 (social networking website server), in particular the hosting engine 818, hosts a social networking website which can be accessed from the marketer device 102 or any of the user devices. A marketer of an entity creates an account with the social networking website. In one embodiment, the marketer accesses the social networking website directly and creates a social page via the social networking website.

In another embodiment, the marketer of the entity also uses services offered by the apparatus 108 to create or manage the social page of the entity. The marketer accesses the service of the apparatus 108 by maintaining an account with the apparatus 108. Example of the service includes Adobe Social and example of the apparatus 108 includes a server maintained by an entity offering social tool. The apparatus 108 provides such service as a cloud based service or in any other form, for example as an application, plugin or any other form of providing the service. The marketer logs into the service via the marketer device 102 and accesses the social networking web site.

The marketer inputs a post, planned for publishing on the social page or any other page on a social networking website, via a user interface offered by the apparatus 108. The post is received by the apparatus 108. The apparatus 108 processes the posts for determining one or more keywords from the post. The apparatus 108 analyzes the post using natural language processing techniques for determining the one or more keywords and such techniques have been described in detail in Example Procedures section. The one or more keywords relate to the entity and can include name of the entity, name of a product of the entity, name of a feature of the product of the entity etc. In one embodiment, the keywords can also be provided as an input by the marketer.

The marketer also provides one or more of a date range, a geographical location, age group, name of a competitor, name of a product of the competitor, or name of a feature of the product of the competitor as an input criteria. The marketer specifies the input criteria using the user interface offered by the apparatus 108. The input criteria is received by the apparatus 108. In some embodiments, default settings of the account of the entity maintained by the apparatus 108 can be used as the input criteria. Examples of the default settings include predefined date range, predefined geographical location, predefined age group etc.

The processing engine 812 then interacts with the apparatus 822 or the storage device 116 to obtain one or more previous posts. The previous posts include the posts already posted by the marketer or other users. In one embodiment, the apparatus 108 queries API (application programming interface) offered by the apparatus 822 to obtain relevant posts. The relevant posts include those previous posts that are associated with the one or more keywords and that satisfy the input criteria. The apparatus provides or sends the one or more keywords and the input criteria to the API as a query and receives the relevant posts as a response from the apparatus 822. In another embodiment, the apparatus 108 accesses the previous posts via the API offered by the apparatus 822 and processes the previous posts to identify the relevant posts. In such scenario, the apparatus 108 may optimize or streamline the access to the previous posts and proceed in a systematic or organized or structured manner. For example, the apparatus 108 may first process the previous posts posted by a particular entity followed by the previous posts posted by any other entity. The particular entity may be the entity itself or a competitor. Similarly, in other examples, the processing can be based on various parameters such as a particular entity, a particular product, a particular feature, a date range, recent posts, geographical location, age group or any other attribute or parameter.

The processing engine 812 then processes the relevant posts to either determine overall sentiment of each relevant post or to determine sentiment of the one or more keywords in each relevant posts. The overall sentiment is determined using various techniques. In one example, the processing engine 812 uses machine learning algorithm based on natural language processing (NLP) to determine overall sentiment of each relevant post. A lexicon based sentiment engine can make use of NLP or lexicons to understand the text and extract the sentiment into three categories: positive, negative and neutral. In another embodiment, other sentiment engine such as one available from Semantria can be used. The output of Semantria can be a numerical value or can be a category of value such as HIGH, LOW, MEDIUM etc. The sentiment score can also be a range or a normalized value. The keyword level sentiment for each relevant post is also determined using various existing techniques as explained in detail in Example Procedure section. Such techniques are used for determining sentiment of a keyword in a sentence, such as the technique provided by Alchemy API can be used in one embodiment. A sentence is inputted and an output indicating sentiment score for each keyword is outputted.

Based on the sentiment scores or values, the processing engine 812 then categorizes the relevant posts into one or more categories. In one embodiment, the categories include 1) posts having positive sentiment for the one or more keywords, 2) posts having negative sentiment for the one or more keywords, and 3) posts having negative sentiment for the one or more keywords when the one or more keywords are used for the entity but having positive sentiment when the one or more keywords are used for some other entity. There can be more such categories as per requirement of the entity or the marketer. Options can be provided to the marketer to add more of such categories. The relevant posts are categorized into such categories. The processing engine 812 determines hashtags used in the relevant posts under each category. The hashtags are determined by either the processing engine 812 or can be queried using an API offered by the apparatus 822. Under each category, the determined hashtags are then ranked based on a predefined criteria. Examples of the predefined criteria include at least one of frequency of appearance of respective hashtag in relevant posts in respective category, number of likes or shares or retweets of relevant post including respective hashtag, number of followers of a person or a user who used respective hashtag, or sentiment of relevant post including respective hashtag. A core is allocated to each hashtag based on each criterion in the predefined criteria. A final score is determined for each hashtag by calculating weighted average of the score corresponding to each criterion. The processing engine 812 then recommends the relevant hashtags under each category based on the ranking. The marketer receives the respective hashtags recommendation via the user interface offered by the apparatus 108, and uses one or more of recommended hashtags for the post planned for publishing. The marketer then publishes the post with relevant hashtags via the apparatus 108. The apparatus 108 enables publishing of the post along with relevant hashtags via the apparatus 822.

The embodiments of the present invention may be embodied as procedures, apparatus, electronic devices, and/or non-transient or non-transitory computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient or non-transitory medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium or non-transient computer-readable medium or non-transitory computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for ranking and recommending hashtags, the method comprising:
    determining one or more keywords from a post to publish by a publisher, the post associated with an entity;
    identifying previous posts on a social networking system including the one or more keywords;
    determining, for the previous posts, hashtags and sentiment categories;
    ranking the hashtags for each sentiment category based on predefined criteria, the predefined criteria comprising at least one of a frequency of appearance of a respective hashtag in the previous posts, a number of likes or shares or reposts of a previous post of the previous posts comprising the respective hashtag, or a number of followers of a person who used the respective hashtag; and
    recommending the hashtags, based on ranking, to the publisher for use with the post to publish.

2. The method as recited in claim 1, wherein identifying the previous posts on the social networking system including the one or more keywords comprises:
    sending a query comprising the one or more keywords to an application programming interface (API) of the social networking system; and
    obtaining, from the social networking system, the previous posts including the one or more keywords.

3. The method as recited in claim 1, wherein determining the one or more keywords comprises analyzing the post to publish to determine a product and one or more features of the product.

4. The method as recited in claim 3, wherein obtaining, from the social networking system, the previous posts comprises receiving, from an API, posts mentioning the product and the one or more features of the product.

5. The method as recited in claim 1, further comprising determining the sentiment categories for the previous posts by determining a sentiment score for each keyword in a given previous post and combining the sentiment scores for the keywords in the given previous post.

6. The method as recited in claim 5, further comprising:
    determining, using machine learning from the previous posts, posts corresponding to a positive sentiment category for the one or more keywords;
    determining, using machine learning from the previous posts, posts corresponding to a negative sentiment category for the one or more keywords; and
    determining, using machine learning from the previous posts, posts corresponding to a positive-negative sentiment category comprising negative sentiment for the one or more keywords when the one or more keywords are used for the entity and positive sentiment when the one or more keywords are used for another entity.

7. The method as recited in claim 6, wherein ranking the hashtags comprises:
    ranking hashtags used in the posts corresponding to the positive sentiment category for the one or more keywords in a first ranking;
    ranking hashtags used in the posts corresponding to the negative sentiment category for the one or more keywords in a second ranking; and
    ranking hashtags used in the posts corresponding to the positive-negative sentiment category for the one or more keywords in a third ranking.

8. The method as recited in claim 6, wherein determining, using machine learning from the previous posts, the posts corresponding to the positive sentiment category for the one or more keywords comprises identifying posts having positive combined sentiment scores.

9. The method as recited in claim 1, wherein ranking the hashtags comprises:
    allocating a score to each hashtag based on each criterion in the predefined criteria; and
    determining a final score for each hashtag by calculating weighted average of the score corresponding to each criterion.

10. A system for ranking and recommending hashtags, the system comprising:
    at least one processor;
    at least one non-transitory computer readable storage medium storing instructions thereon, that, when executed by the at least one processor, cause the system to:
        determine one or more keywords from a post to publish by a publisher, the post associated with an entity,
        identify previous posts on a social networking system including the one or more keywords;
        determine, for the previous posts, hashtags and sentiment categories;
        rank the hashtags for each sentiment category based on predefined criteria, the predefined criteria comprising at least one of a frequency of appearance of a respective hashtag in the previous posts, a number of likes or shares or reposts of a previous post of the previous posts comprising the respective hashtag, or a number of followers of a person who used the respective hashtag; and
        recommend the hashtags, based on ranking, to the publisher for use with the post to publish.

11. The system as recited in claim 10, further comprising instructions, that when executed by the at least one processor, cause the system to identify the previous posts on the social networking system including the one or more keywords by:
    sending a query comprising the one or more keywords to an API of the social networking system; and obtaining, from the social networking system, the previous posts including the one or more keywords.

12. The system as recited in claim 10, further comprising instructions, that when executed by the at least one processor, cause the system to determine the predefined criteria.

13. The system as recited in claim 10, further comprising instructions, that when executed by the at least one processor, cause the system to:
   determine, from the previous posts, posts corresponding to a positive-negative sentiment category comprising negative sentiment for the one or more keywords when the one or more keywords are used for the entity and positive sentiment when the one or more keywords are used for another entity; and
   rank hashtags used in the posts corresponding to the positive-negative sentiment category separately from other hashtags used in other of the previous posts corresponding to other sentiment categories.

14. The system as recited in claim 10, further comprising instructions, that when executed by the at least one processor, cause the system to:
   determine, from the previous posts, posts corresponding to a positive sentiment category for the one or more keywords;
   determine, from the previous posts, posts corresponding to a negative sentiment category for the one or more keywords; and
   rank hashtags used in the posts corresponding to the positive sentiment category for the one or more keywords separately from hashtags used in the posts corresponding to the negative sentiment category for the one or more keywords.

15. The system as recited in claim 10, wherein the instructions, when executed by the at least one processor, cause the system to recommend the hashtags, based on ranking, to the publisher for use with the post to publish by identifying and recommending hashtags with a score above a threshold score.

16. The system as recited in claim 10, further comprising instructions, that when executed by the at least one processor, cause the system to determine scores for the hashtags by combining a sentiment score for a given hashtag and a number of followers of users who used the given hashtag.

17. A non-transitory computer readable medium storing computer instructions that, when executed by at least one processor, cause a computing device to:
   determine one or more keywords from a post to publish by a publisher, the post associated with an entity,
   identify previous posts on a social networking system including the one or more keywords;
   determine, for the previous posts, hashtags and sentiment categories;
   rank the hashtags for each sentiment category based on predefined criteria, the predefined criteria comprising at least one of a frequency of appearance of a respective hashtag in the previous posts, a number of likes or shares or reposts of a previous post of the previous posts comprising the respective hashtag, or a number of followers of a person who used the respective hashtag; and
   recommend the hashtags, based on ranking, to the publisher for use with the post to publish.

18. The computer readable medium as claimed in claim 17, wherein the instructions, when executed by the at least one processor, cause the computing device to:
   obtain an input criteria for the post to publish;
   send a query comprising the one or more keywords and the input criteria to an API of the social networking system; and
   obtaining, from the social networking system, the previous posts including the one or more keywords that satisfy the input criteria.

19. The computer readable medium as claimed in claim 18, wherein the input criteria comprises one or more of an age group, a geographical location, a date range, or a name of a competitor.

20. The computer readable medium as claimed in claim 17, further comprising instructions that, when executed by the at least one processor, cause the computing device to:
   determine, from the previous posts, posts corresponding to a positive-negative sentiment category comprising negative sentiment for the one or more keywords when the one or more keywords are used for the entity and positive sentiment when the one or more keywords are used for another entity; and
   rank hashtags used in the posts corresponding to the positive-negative sentiment category separately from other hashtags used in other of the previous posts corresponding to other sentiment categories.

* * * * *